United States Patent [19]

Stapleton

[11] Patent Number: 4,901,902
[45] Date of Patent: Feb. 20, 1990

[54] LONGITUDINAL SLAT FOR LUGGAGE CARRIER

[75] Inventor: Craig Stapleton, Port Huron, Mich.

[73] Assignee: Huron/St. Clair Company, Port Huron, Mich.

[21] Appl. No.: 225,554

[22] Filed: Jul. 28, 1988

Related U.S. Application Data

[63] Continuation of Ser. No. 15,782, Feb. 17, 1987, abandoned.

[51] Int. Cl.$^4$ ............................................. B60R 9/04
[52] U.S. Cl. ...................................... 224/326; 224/327
[58] Field of Search ................ 224/309, 325, 326, 327

[56] References Cited

U.S. PATENT DOCUMENTS

| | | | |
|---|---|---|---|
| 3,120,914 | 2/1964 | Smith | 224/326 |
| 3,325,068 | 6/1967 | Helm | 224/325 |
| 3,519,179 | 7/1970 | Stephen | 224/326 |
| 3,615,069 | 10/1971 | Bott | 248/340 |
| 3,856,194 | 12/1974 | Helm | 224/326 |
| 3,951,320 | 4/1976 | Bott | 224/326 |
| 4,055,285 | 10/1977 | Bott | 224/326 |
| 4,265,383 | 5/1981 | Ferguson | 224/326 |
| 4,299,346 | 11/1981 | Helm | 224/325 |
| 4,341,332 | 7/1982 | Kowalski et al. | 224/326 |

Primary Examiner—Renee S. Luebke
Attorney, Agent, or Firm—Edgar A. Zarins; Malcolm L. Sutherland

[57] ABSTRACT

A longitudinal slat for a luggage carrier which incorporates a chrome-metal slat body detachably mounted to a plastic insulator. In addition to separating the slab body from the vehicle surface, the insulator provides additional load-bearing support for the slat. Integrally formed with the insulator and extending the length of the slat is a substantially H-shaped center support which reinforces the horizontal load-bearing wall of the slat body. The entire structure is secured to the surface of the vehicle by a series of mounting screws.

11 Claims, 2 Drawing Sheets

LONGITUDINAL SLAT FOR LUGGAGE CARRIER

This is a continuation of co-pending application Ser. No. 015,782, filed on Feb. 17, 1987, now abandoned.

BACKGROUND OF THE INVENTION

I. Field of the Invention

The present invention relates to longitudinal slats for vehicle luggage carriers and, in particular, to an insulator construction for longitudinal slats adapted to be disposed between the load-bearing slat body and the vehicle surface in order to prevent damage to the surface and to provide added support for the slat.

II. Description of the Prior Art

Longitudinal support slats are widely used in luggage carriers to form a load-bearing surface within the luggage rack and prevent damage to the paint surface of either the vehicle roof or rear deck. The slats are generally mounted in parallel, longitudinal arrangement in order to minimize wind resistance by allowing air flow across the vehicle surface beneath the luggage. Typically, such slats include an elongated slat body constructed of chrome-metal and an insulator disposed between the metal body and the vehicle surface. The insulator may be planar such that it extends beneath the entire slat body or may merely follow the peripheral configuration of the body. Mounting screws extending through the slat body and the insulator secure the slat to the surface.

In a typical construction, the insulator provides a water-tight seal while preventing metal-to-metal contact between the slat body and the vehicle surface. Any load support is provided strictly by the structural configuration and strength of the slat body. Many different configurations have been adapted to improve strength and aerodynamics resulting in increased manufacturing costs. In addition, the past known slats have been designed to be mounted to substantially flat surfaces such as the rear deck or roof of the vehicle. Thus, a longitudinal slat having a simple body construction for ease of manufacture yet has sufficient structural strength to support extreme loads is needed.

SUMMARY OF THE PRESENT INVENTION

The present invention overcomes the disadvantages of the prior known longitudinal slats by providing a slat and insulator construction with increased load-bearing support.

The luggage carrier slat according to the present invention comprises a plastic molded or extruded insulator with an elongated slat body detachably mounted thereto. Both the slat body and the insulator include a plurality of mounting holes adapted to receive mounting screws for securing the slat to the vehicle surface. As is well known, the slat body has a simple frusto-pyramidal cross-section with tapered end portions for ease of manufacture while minimizing aerodynamic resistance. In the preferred embodiment, the slat body is made of chrome-metal.

The plastic insulator includes a central support portion, which extends the length of the slat, and outwardly extending support flanges which separate the lateral edges of the slat body from the vehicle surface. The outwardly extending flanges include slat body receiving grooves for joining the two components and outer contact pads which conform to the contour of the vehicle surface to which the longitudinal is mounted. The center support portion of the insulator has a substantially H-shaped cross-section and extends between the vehicle surface and the load-bearing wall of the slat body. Thus, the insulator improves the load-bearing strength of the longitudinal slat by supporting the upper load-bearing surface thereof.

Furthermore, the insulator is designed so that it will conform to the irregular contour of the vehicle roof surface inherent to the compatible vehicle design. In addition, the cross-sectional configuration of the insulator is designed to allow an even flow of material during extrusion molding of the insulator. The spaces through the "H" section facilitate construction by reducing material thickness and therefore warpage due to shrinkage of the plastic material during cooling.

Other objects, features, and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which.

DETAILED DESCRIPTION OF A PREFERRED EMBODIMENT OF THE PRESENT INVENTION

Figure 1:
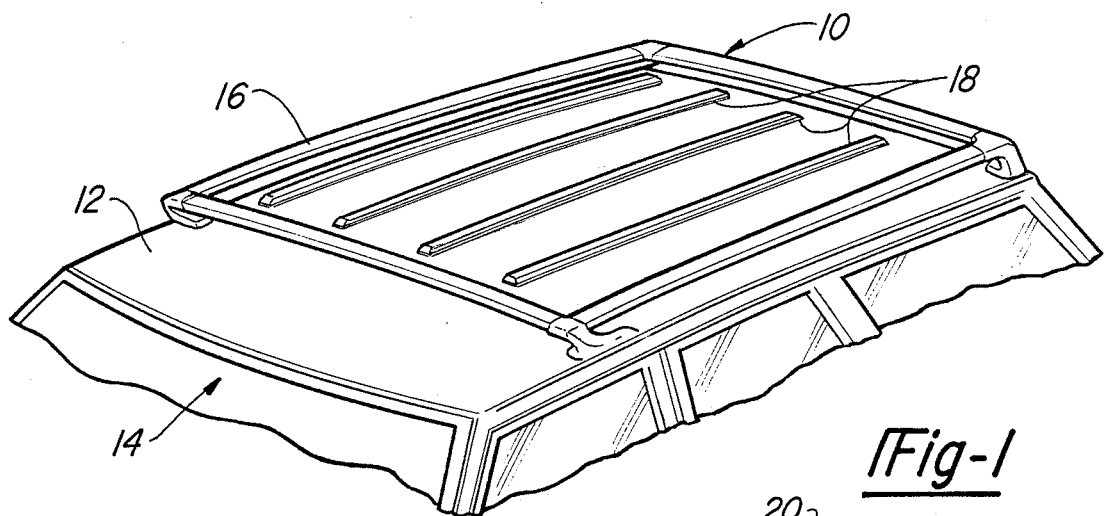
FIG. 1 is an elevational perspective of a plurality of longitudinal slats mounted to the roof of a vehicle in accordance with the present invention.

Referring first to FIG. 1, there is shown a luggage carrier 10 mounted to a surface 12 of a vehicle 14. The carrier 10 may be mounted to either the roof of the vehicle 14 as shown in FIG. 1 or to a rear deck surface (not shown). Preferably, the luggage carrier 10 comprises a peripheral rack 16 elevated above the vehicle surface 12 in order to contain cargo stored therein, and a plurality of longitudinally-extending, load-supporting slats 18 upon which the cargo is supported. The slats 18 are mounted in a longitudinal arrangement in order to minimize wind resistance by allowing air flow beneath the cargo stored in the luggage carrier 10.

Figure 2:
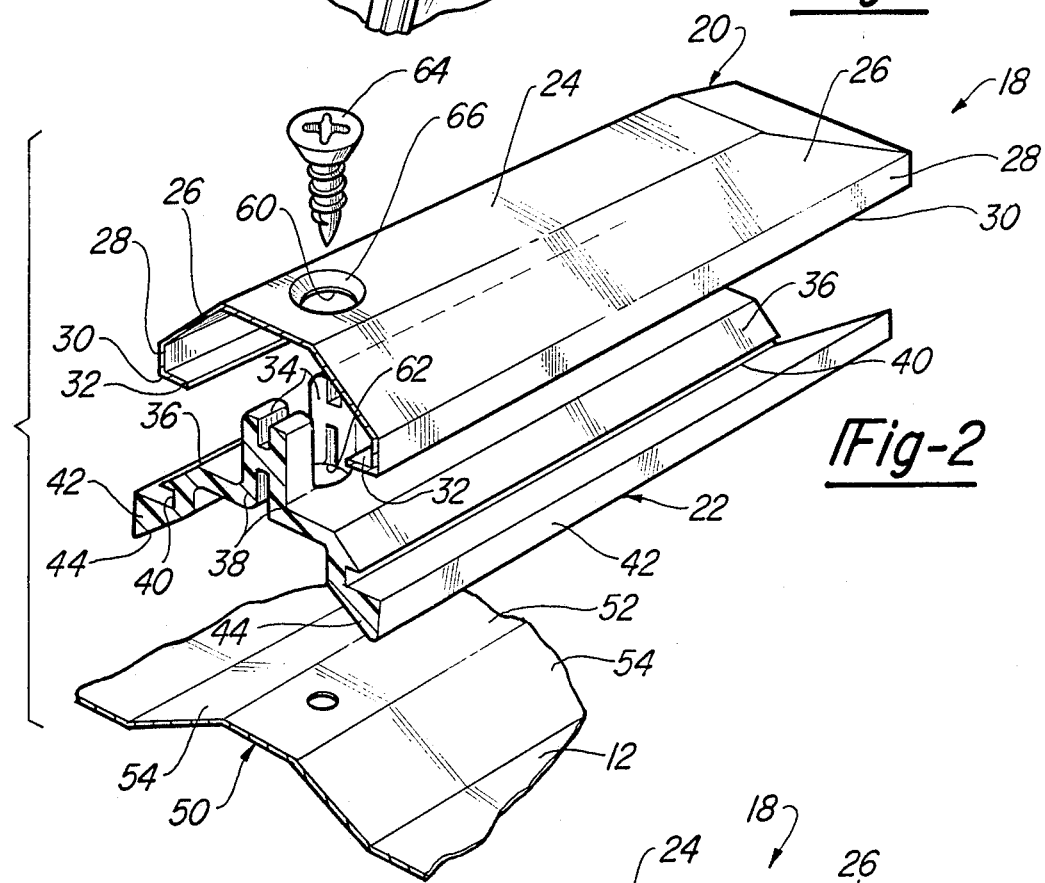
FIG. 2 is an exploded perspective of the longitudinal slat of the present invention.
Figure 3:
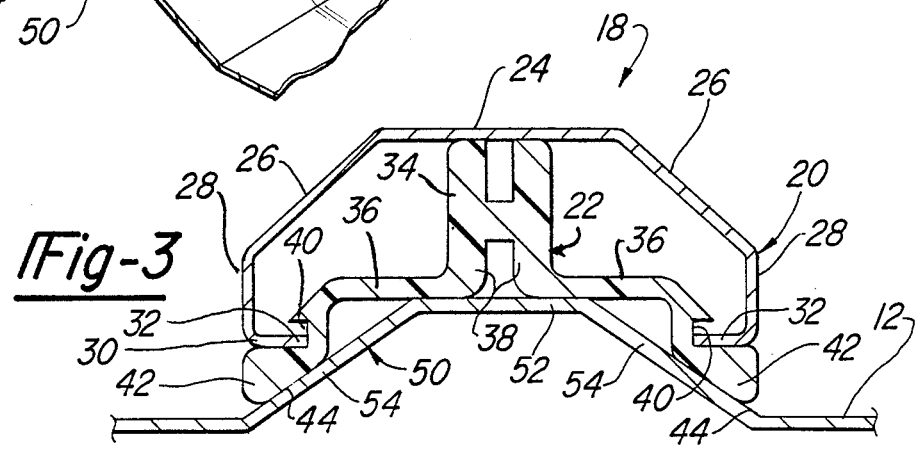
FIG. 3 is a cross-sectional view of the longitudinal slat of the present invention.

Referring now to FIGS. 2 and 3, the slat 18 generally comprises an elongated slat body 20 detachably mounted to an insulator 22. The slat body 20 has a substantially frusto-pyramidal configuration with an upper load-bearing wall 24. The load-bearing wall 24 is orientated parallel to the vehicle surface 12 in order to form a stable surface for the cargo disposed within the carrier 10. Extending downwardly at an angle from the wall 24 are side walls 26 and end walls 28 which are designed to reduce the wind resistance of the slat 18. Formed at the bottom of the walls 26 and 28 is a peripheral edge 30 having an inwardly extending lip 32 which facilitates attachment of the slat body 20 to the insulator 22 as will be subsequently described. Preferably, the slat body 20 is formed of a stamped chrome-metal construction.

The insulator 22 of the present invention is adapted to be disposed beneath the slat body 20 in order to protect the painted surface 12 of the vehicle body and at the same time provide a support surface for the peripheral edge 30 and lip 32 of the slat body 20. In the preferred embodiment, the insulator 20 is extrusion molded of a plastic material although any non-abrasive material may be utilized in order to protect the vehicle surface 12. The insulator 22 comprises a central support beam 34 integrally formed with outwardly extending flanges 36. The flanges 36 extend substantially the length of the slat body 20 while the central support 34 extends the length of the load-bearing wall 24. As best shown in FIG. 3, the central support 34 has an H-shaped cross-section with flanges 36 extending outwardly from the lower legs 38 of the support beam 34. Such a configuration provides substantially uniform thicknesses throughout the insulator 22 which facilitates production by reducing warpage and other defects during the extrusion molding process.

Formed near the outer ends of the flanges 36 are longitudinally extending grooves 40 adapted to receive the peripheral lip 32 of the slat body 20. The flanges 36 are configured such that when lip 32 extends into grooves 40 the slat body 20 and, in particular, wall 30, rest upon mounting pads 42 which prevent contact between the slat body 20 and the vehicle surface 12.

In the embodiment shown in FIG. 3, the pads 42 are configured to permit mounting of the slat 18 upon a ridge 50 formed in the vehicle surface 12. Generally, the ridge 50 is adapted to receive a load-bearing slat of the luggage carrier 10 and includes an upper surface 52 and side walls 54. Accordingly, the pads 42 include a lower surface 44 which is angled to cooperate with the sloped walls 54 of the ridge 50. Moreover, the H-shaped central support 34 extends between the upper surface 52 of the ridge 50 and the load-bearing wall 24 of the slat body 20 in order to provide extra support for the slat body 20.

Figure 4:
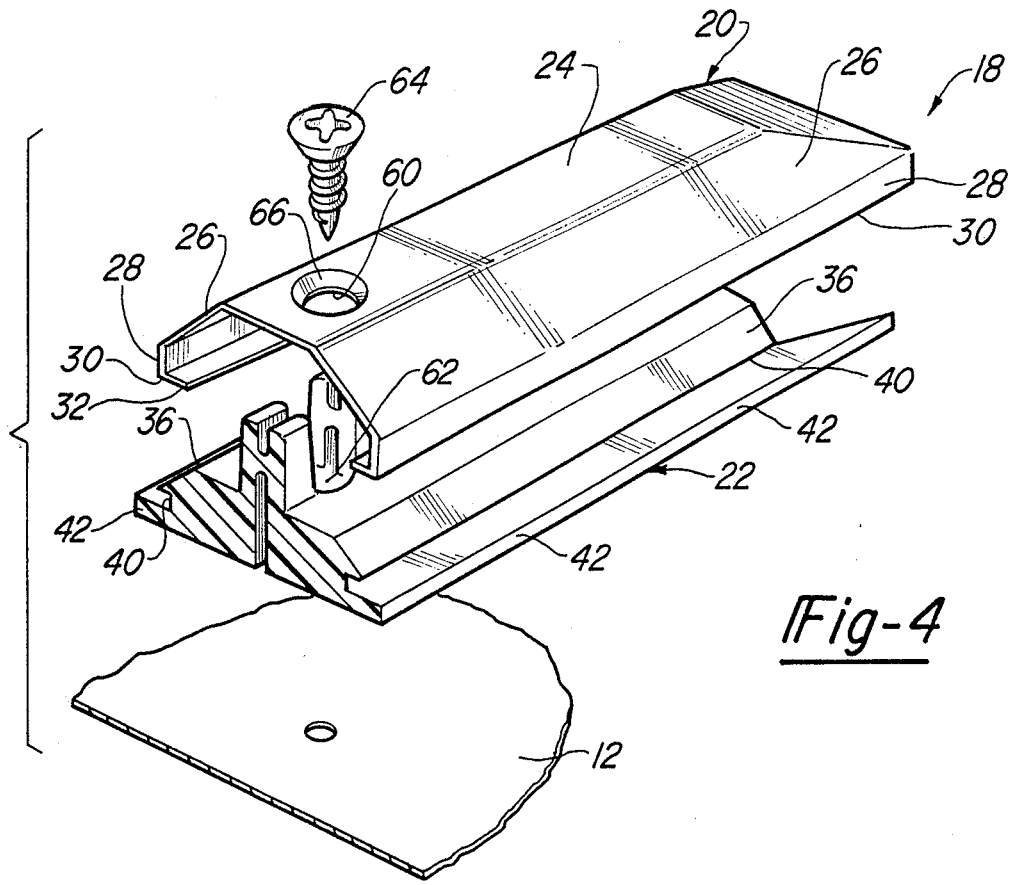
FIG. 4 is an exploded perspective of an alternate embodiment of the longitudinal slat.
Figure 5:
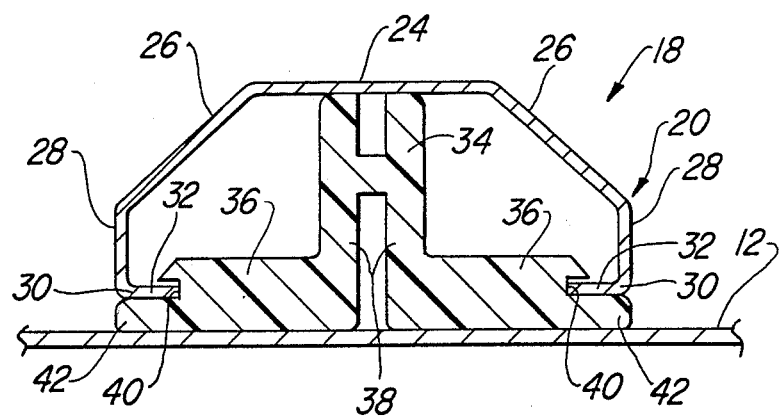
FIG. 5 is a cross-sectional view of an alternate embodiment of the longitudinal slat of the present invention.

An alternate embodiment shown in FIG. 4 depicts the slat 18 mounted to a substantially flat surface 12 of the vehicle 14. In this embodiment, the flanges 36 extend outwardly from the central support 34 parallel to the vehicle surface 12. In this fashion, the H-shaped central support beam 34 extends between the vehicle surface 12 and the load-bearing wall 24 of the slat body 20 in order to provide additional support therefor. Moreover, the flanges 36 are fully supported by the vehicle surface 12.

The slat 18 is assembled for storage or transport prior to being mounted to the vehicle 14 by attaching the slat body 20 to the insulator 22. This is accomplished by fitting the peripheral lip 32 of the slat body 20 within the grooves 40 of the insulator 22. Both the slat body 20 and the insulator 22 include aligned apertures 60 and 62, respectively, which receive a mounting screw 64 for securing the longitudinal slat 18 to the vehicle surface 12. Preferably, the aperture 60 includes a recess 66 to receive the head of the mounting screw 64 and provide a flush load-bearing surface 24.

Thus, the present invention provides an insulator 22 which includes a central portion 34 to provide additional support for the load-bearing wall 24 of the slat body 20 and outwardly extending flanges 36 which detachably receive and support the peripheral edge 30 of the slat body 20. In this manner, contact between the metal slat body 20 and the vehicle surface 12 is prevented while the slat body 20 is additionally supported to accommodate increased cargo loads. Morover, the configuration of the insulator 22, particularly the H-shaped configuration of the central support 34, makes it conducive to efficient manufacture using extrusion molding techniques by eliminating warpage caused by differences in wall thickness.

The foregoing detailed description has been given for clearness of understanding only and no unnecessary limitations should be understood therefrom as some modifications will be obvious to those skilled in the art without departing from the scope and spirit of the appended claims.

I claim:

1. A load supporting slat for a vehicle luggage carrier adapted to be mounted to a surface of a vehicle, said slat comprising:

an elongated slat body having a top load-bearing wall substantially parallel to the vehicle surface;

an integral insulator disposed beneath said slat body and extending substantially the length of said slat body, said insulator including a longitudinally extending central support beam which extends vertically between the vehicle surface and said load-bearing wall of said slat body to provide support substantially over the length of said load-bearing wall and integral flange portions extending laterally outwardly from opposite sides of the bottom end of said longitudinally extending central support beam; and means for securing said slat body and insulator to the vehicle surface;

said central support beam of said insulator having an H-shaped cross-sectional configuration with a pair of substantially parallel support legs extending between the vehicle surface and said load-bearing wall of said slat body and a cross support member extending between intermediate points of and perpendicular to said legs of said central support beam, said flange portions extending outwardly from the bottom end of said legs at least partially along the vehicle surface to engage the outer edges of said slat body.

2. The slat as defined in claim 1 wherein said central support beam and said outwardly extending flanges of said insulator are integrally formed through plastic extrusion.

3. The slat as defined in claim 1 wherein said means for securing comprises mounting screws extending through apertures in said top load-bearing wall of said slat body and said central beam of said insulator.

4. The slat as defined in claim 1 wherein said slat body includes spaced side walls having an inwardly extending lip and said flange portions of said insulator include longitudinal grooves, said lips of said slat body being received within said grooves of said insulator to secure said slat body to said insulator.

5. The slat as defined in claim 4 wherein said slat body has a substantially frusto-pyramidal configuration with said top load-bearing wall, a pair of inclined walls extending downwardly from opposite sides of said load-bearing wall, and said spaced side walls extending downwardly from said inclined walls.

6. The slat as defined in claim 4 wherein said flange portions of said insulator include longitudinally extending pads formed at the outer ends of said flanges, said pads configured to conform to a contour of the vehicle surface.

7. The slat as defined in claim 6 wherein said pads have lower sloped surfaces to cooperate with ridges formed on the vehicle surface to securely position said slat on the vehicle surface.

8. A load supporting slat for a vehicle luggage carrier adapted to be mounted to a surface of a vehicle, said slat comprising:
   an elongated insulator;
   an elongated slat body detachably secured to said insulator, said slat body having a substantially frusto-pyramidal configuration with a central load-bearing wall extending centrally substantially the length of said slat body, inclined walls sloping outwardly from said central load-bearing wall and spaced-apart side walls extending downwardly from said inclined walls; and
   means for securing said slat body and insulator to the vehicle surface;
   said insulator including an elongated central support beam extending substantially the length of said central load-bearing wall of said slat body and flange portions extending outwardly from opposite sides of a bottom end of said support beam, said support beam extending vertically between the vehicle surface and said central load-bearing wall to provide support over the length of said central load-bearing wall, said support beam having an H-shaped cross-sectional configuration with a pair of substantially parallel vertical support legs extending between the vehicle surface and said load-bearing wall and a substantially perpendicular cross support member extending between intermediate points of said legs of said central support beam, said flange portions extending outwardly from the bottom ends of said legs at least partially along the vehicle surface to engage said side walls of said slat body.

9. The slat as defined in claim 8 wherein the outer ends of said outwardly extending flanges include insulator pads configured to conform to a contour of the vehicle surface and longitudinal grooves to receive inwardly extending lips of said side walls of said slat body to detachably secure said slat body to said insulator.

10. In a load supporting slat for a vehicle luggage carrier adapted to be mounted to a surface of a vehicle and including a frusto-pyramidal slat body having a central upper load-bearing wall, inclined walls sloping outwardly from the central load-bearing wall, spaced-apart side walls extending downwardly from the inclined walls, and an inwardly extending lip formed at the bottom of the side walls, an insulator comprising:
   a central support beam extending along and supporting the central load-bearing wall, said support beam having an H-shaped cross-sectional configuration including a pair of vertically oriented parallel legs extending between the vehicle surface and the load-bearing wall and a horizontal cross member extending between mid-points of said parallel legs; and
   mounting flanges extending outwardly from the bottom ends of said vertical legs of said support beam and integrally formed therewith, said flanges extending beneath a bottom lip of the slat body and including grooves to receive said lip to detachably secure the slat body to said insulator.

11. The insulator as defined in claim 10 wherein said insulator is integrally formed through plastic extrusion.

* * * * *